UNITED STATES PATENT OFFICE.

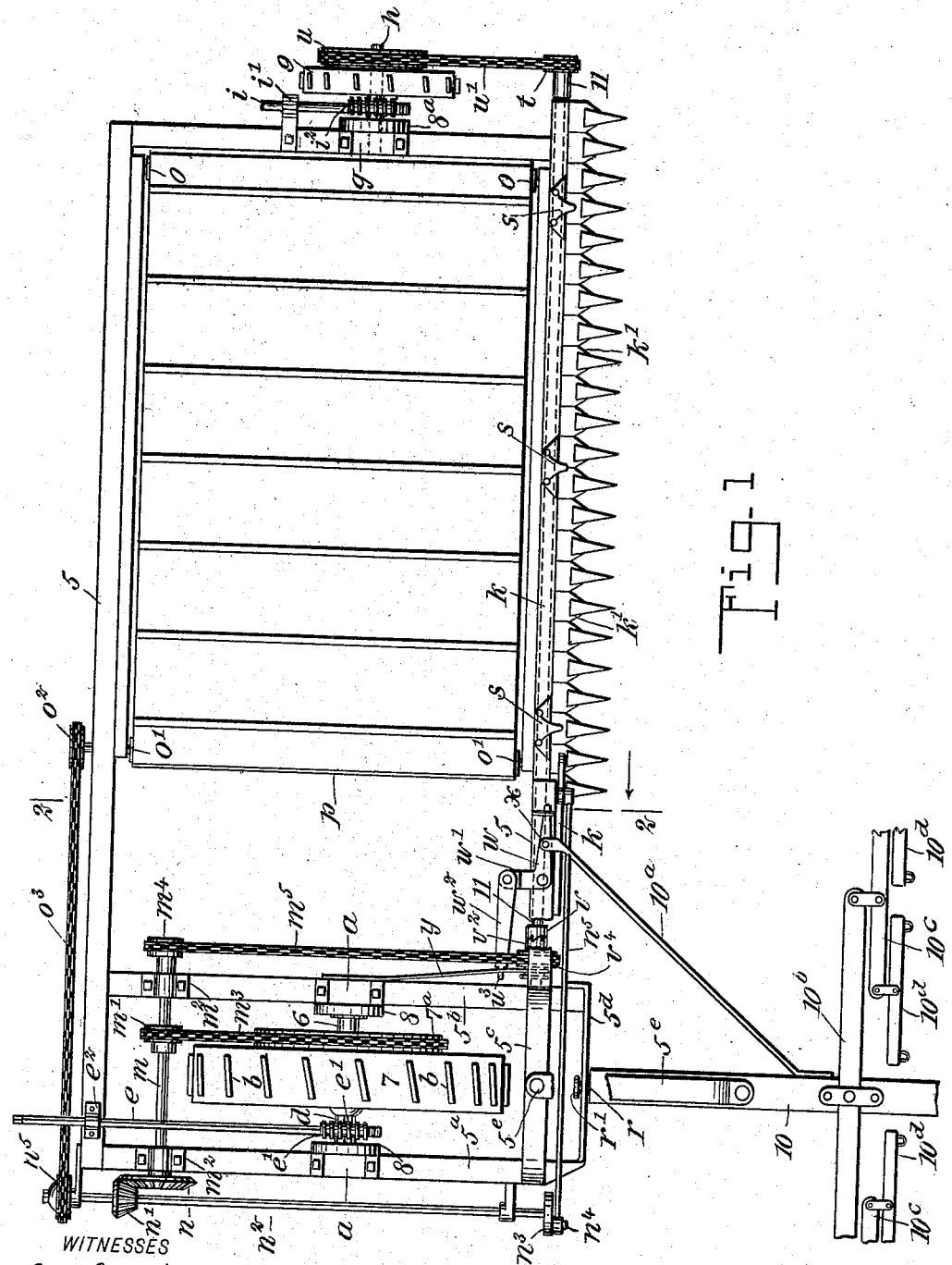

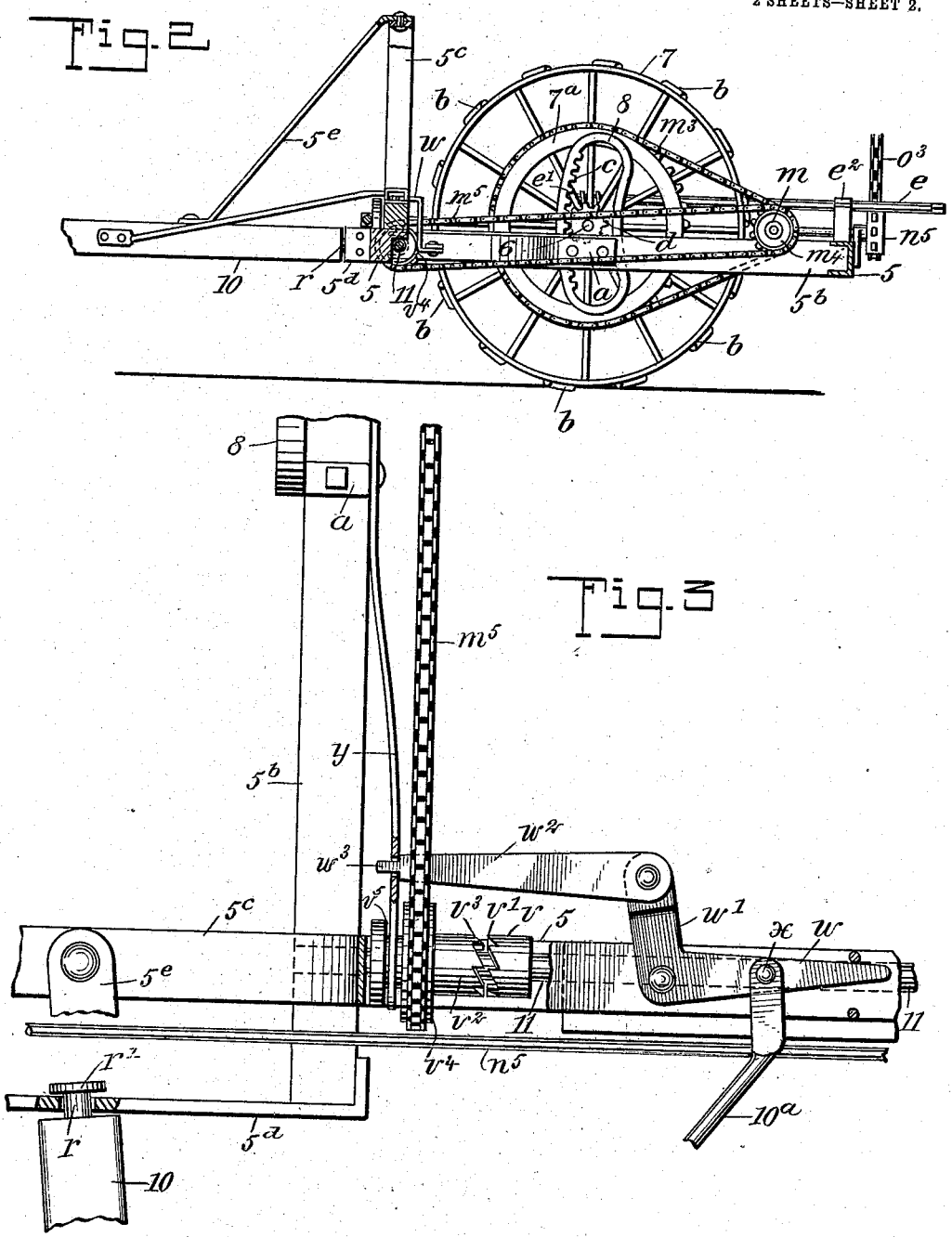

CHARLES FREDERICK BLAKESLEE, OF RAPATEE, ILLINOIS.

HARVESTER.

No. 899,944.  Specification of Letters Patent.  Patented Sept. 29, 1908.

Application filed November 12, 1907. Serial No. 401,796.

*To all whom it may concern:*

Be it known that I, CHARLES FREDERICK BLAKESLEE, a citizen of the United States, and a resident of Rapatee, in the county of Knox and State of Illinois, have invented certain new and useful Improvements in Harvesters, of which the following is a full, clear, and exact description.

The purpose of this invention is to provide novel details of construction for the draft mechanism of a harvester, that greatly reduce draft strain by enabling the direct transmission of progressive movement from the main driving traction wheel, to the other ground wheel that supports the outer end of the grain table, thus causing said ground wheel to travel with the same speed as that of the traction wheel, and preventing the usual drag of the ground wheel which increases side draft while the machine is in service.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a plan view of a harvester machine and of improved details of construction thereon; Fig. 2 is a partly sectional side elevation taken substantially on the line 2—2 in Fig. 1, seen in direction of the arrow, and Fig. 3 is an enlarged plan view of details, embodying features of the improvement.

The invention may be applied upon harvester machines of any approved construction that cut with sickle blades reciprocated along with a cutter bar, have a horizontal grain table, a main driving traction wheel, and a coöperative ground wheel which supports the outer end of the grain table in a level position.

In the drawings that represent the application of the invention upon a harvester of ordinary construction, 5 indicates a rectangular frame having sufficient width and length for the proper support of working details of the harvester, some of said details being omitted, as they do not have direct relation to the invention and therefore are not required for its disclosure.

Upon the frame 5, near one end bar $5^a$ thereof, a cross bar $5^b$ is introduced, that is disposed parallel with said end bar $5^a$. In suitable boxes $a$, that are centrally mounted upon and secured to the frame members $5^a$, $5^b$, the journaled ends of a driving shaft 6 are supported for rotation, and upon said shaft a main traction wheel 7 of suitable dimensions, is secured, this wheel having the usual fins $b$ formed on the face of its rim for contact with the ground and thus insure a positive rotation of the wheel 7 and shaft 6. Upon the sides of the boxes $a$, that are nearest to the wheel 7, similar sector gears are secured, said sectors 8 having their teeth $c$ disposed on the concave sides thereof, as indicated for one sector in Fig. 2. Upon the driving shaft 6, adjacent to one of the boxes $a$, a spur pinion $d$ is mounted and loosely secured, as shown for one pinion in Fig. 2, said pinion meshing with the teeth of the concave rack or sector 8; and although not shown, it is to be understood that a similar pinion is loosely secured on the driving shaft near the other end thereof for a like meshed engagement with the sector secured on the adjacent box $a$. The pinion $d$, that meshes with the sector 8, projects toward the hub of the traction wheel 7, and geared with the teeth of the pinion thus extended laterally, is a worm gear $e'$, that is carried by a shaft $e$, that extends to and is supported for rotation in a box $e^2$, mounted upon the rear longitudinal member of the main frame 5. The shaft $e$ is adapted for rotation by any suitable tool, thus rotating the pinion $d$, which will if turned in a proper direction, move the sector 8 upward, and thus elevate the end of the main frame supported by the traction wheel, a similar provision, not shown, being made for moving the twin sector at the other end of the driving shaft 6. Upon the other end of the main frame 5, directly opposite the boxes $a$, a box $g$ is secured, from which extends a stub axle $h$, upon which is rotatably mounted a ground wheel 9, of less diameter but similar form to that of the traction wheel 7. Upon the box $g$, or equivalent support, a sector $8^a$ that is similar to the sectors 8, is secured, and is engaged by a pinion, not shown, on the axle $h$ that is a projection from the hub of the ground wheel 9.

A shaft $i$, shown broken away, is supported by any suitable means, such as a box $i'$ on the end of the frame 5, and on said shaft is a worm gear $i^2$ that meshes with the pinion last mentioned, and it will be seen that by a proper rotatable adjustment of the shaft $i$, the sector $8^a$ and the end of the main frame 5 upon which it is secured, may be raised or lowered as occasion may require; this sector $8^a$ and the others at the opposite end of the frame 5, affording means for giving the platform on the main frame a level position, at any desired height from the ground upon which the wheels 7 and 9 travel.

The usual cutter bar $k$, having knives $k'$ thereon, is slidably supported at the front of the main frame 5 by clips $s$, said bar being reciprocated by the means shown, comprising the following details. Upon the main shaft 6, at one side of the traction wheel 7, a sprocket gear $7^a$ is secured, opposite a smaller sprocket gear $m'$ mounted on a countershaft $m$, that is carried in boxes $m^2$ on the frame members $5^a$, $5^b$, and as shown in Fig. 1, these sprocket gears are connected by a sprocket chain $m^3$. Upon an end of the countershaft $m$, that extends outside of the end of the main frame 5, a bevel gear $n$ is mounted and secured, said gear meshing with a bevel pinion $n'$ on a rotatably supported shaft $n^2$ that is disposed at right angles with the main shaft 6. On the front end of the shaft $n^2$, a crank disk $n^3$ is secured, and upon the pin $n^4$, that projects therefrom, an end box on a connecting rod $n^5$, is mounted, the opposite end of said rod being loosely connected with the cutter bar $k$, and it will be evident that by the gear connection of the latter with the main shaft 6, a rotation of the traction wheel 7 will correspondingly reciprocate the cutter bar and knives thereon.

On the main frame 5, near the end thereof carrying the ground wheel 9, an elongated roller $o$ is journaled at its ends in the front and rear members of said frame, and at a suitable distance from the roller $o$, a similar roller $o'$ is journaled in the same members of the frame parallel with the roller $o$. Upon the roller $o$, $o'$, an endless apron $p$ is mounted taut, and constitutes a grain table for the harvester machine, said apron being progressively moved by the following means: On the rear end of the shaft that affords a journal for the roller $o'$ and that projects from the frame 5, a sprocket gear $o^2$ is secured, and on a corresponding end of the shaft $n^2$, a similar gear $n^5$ is mounted and affixed, these gears being connected by a sprocket chain $o^3$.

It will be seen that upon forwardly moving the traction wheel 7 and correspondingly rotating the shaft 6, rotary motion will be communicated to the shaft $n^2$ and thence by means of the chain $o^3$ to the roller $o'$, whereby the apron $p$ will be moved longitudinally for discharge of grain therefrom that is deposited by the cutting action of the knives $k'$.

The mechanism hereinbefore described is in use on well constructed harvester machines and is not claimed, but has been shown and briefly described, to more clearly identify the invention that will be described, with harvesters that are equipped with other improvements but are defective in the matter of side draft on the cutter knives.

Upon the front of the main frame 5 and opposite the gear frame members $5^a$, $5^b$, that carry the boxes $a$, a bracket frame $5^c$ is secured, consisting of a flat bar bent into inverted U-shape, this frame having the ends of its depending members seated upon the frame members named and secured thereto.

A draft yoke $5^d$ is provided, comprising a flat bar of metal, having its ends bent rearward at different angles, and respectively secured upon the end portions of the frame bars $5^a$, $5^b$, thus disposing the body of the yoke in front of and parallel with the forward edges of the bracket frame $5^c$.

A draft pole 10 of usual form, is coupled at its rear end with the yoke $5^d$ by means of a headed bolt $r$, the body of said bolt being secured in the pole and projecting therefrom so as to afford a neck that is loosely engaged within an opening formed in the yoke piece near its center, the head $r'$ of the bolt holding said bolt neck in swiveled engagement with the yoke, as is clearly shown in Fig. 1.

From the crown of the bracket frame $5^c$, a stay bar $5^e$ is forwardly and downwardly extended and at its lower end is pivotally secured on the draft pole 10, thus supporting it as represented in Fig. 2. The stay bar $5^e$ is pivoted at its upper end upon the crown of the bracket frame $5^c$, thus permitting the draft pole to receive limited lateral movement. In the frame bar $5^b$ or a box thereon, not shown, one end of a driven shaft 11 is journaled, said shaft extending across the front of the main frame 5 below the cutter bar $k$, and being supported between its ends in boxes not shown, secured on the front bar of said frame. Upon the end of the driven shaft 11, that extends beyond the main frame 5 and is disposed parallel with the stub axle $h$, a small sprocket wheel $t$ is secured, opposite a larger sprocket gear $u$, affixed upon the stub axle outside of the ground wheel 9, and said gears $t$ and $u$ are connected by a sprocket chain $u'$.

On the shaft 11, near the frame cross bar $5^b$, a clutch block $v$ is secured, having the toothed end wall $v'$ thereof faced toward said cross bar. Between the clutch block $v$ and the frame bar $5^b$, a slidable clutch head $v^2$ is mounted upon the driven shaft 11, having teeth $v^3$ on one end that mate those on the fixed clutch block $v$, with which they will interlock if the clutch head is pressed into engagement therewith. Upon the body of the clutch head $v^2$, a sprocket gear $v^4$ is mounted and secured, said gear being positioned directly opposite a similar sprocket gear $m^4$, secured on the end of the countershaft $m$, that extends laterally from the frame crossbar $5^b$. A sprocket chain $m^5$ is mounted upon the gears $v^4$ and $m^4$, thus directly connecting the clutch head with the shaft 6 and traction wheel 7.

An angle lever $w$, is pivoted at its corner on the main frame bar above the shaft 11, and on the short arm $w'$ of said lever which projects rearward, one end of a link $w^2$ is secured, the body of which projects toward the cross bar $5^b$, between the runs of the sprocket chain $m^5$. On the cross bar $5^b$, one end of a resilient arm $y$ is secured, the other end thereof that projects toward the clutch head $v^2$, having a loose engagement within an annular groove $v^5$ in said clutch head. The end of the link $w^2$ is reduced to form a finger thereon, and as is clearly shown in Fig. 3, said finger $w^3$ is loosely inserted through a perforation in the resilient arm $y$.

Upon an appropriate side of the draft pole 10, one end of a pusher bar $10^a$ is secured and trends from the draft pole toward the long member of the angle lever $w$, whereon it is pivoted as shown at $x$ in Figs. 1 and 3.

The relative construction and arrangement of the parts hereinbefore described is such, that the clutch head $v^2$ will be interlocked with the clutch block $v$ when the pole 10 is disposed at a right angle to the cutter bar $k$, so that a direct forward pull on the draft pole will cause the clutch head to remain interlocked with the clutch block, and thus transmit rotary motion by means of the intermediate gears and chains from the traction wheel 7 to the driven shaft 11, and through said shaft cause the simultaneous rotation of the ground wheel 9 in the same direction as that of the traction wheel 7. Upon the draft pole 10, an equalizing bar $10^b$ is centrally pivoted, and at the ends of said bar the ordinary double and single trees $10^c$, $10^d$ are mounted. Preferably, the disposal of the hitching means for draft animals enables two animals to be hitched at each side of the pole, thus equalizing draft upon each side of the traction wheel 7.

It will be noted that the pole 10, when pulling the machine, is disposed in alinement with the transverse center of the traction wheel, so that the pull on the pole will be directly opposite said wheel. Furthermore, it will be seen that as the rotation of the traction wheel is adapted to enforce a similar rotation of the ground wheel 9, the usual backward lagging action or side draft, at the outer end of the cutter bar, is entirely eliminated, and the cutting action rendered easier on the draft animals, as they are working with a direct pull on the load.

As arranged, the swing of the draft-pole 10, toward the cutter bar $k$, will press the pusher bar $10^a$ longitudinally toward the shaft 11, which will rock the long arm of the angle lever $w$ rearwardly, and press the link $w^2$ endwise against the resilient arm $y$, which in turn will yield and shift the clutch head $v^2$ away from the clutch block $v$, thus obviously arresting the rotary motion of the driven shaft 11 and permitting the ground wheel 9 to rotate rearward without impediment, this automatic release of the ground wheel enabling a turning movement to be made toward the ground wheel.

The arrangement of parts as shown and described, is for what is known as a left hand cutting machine, but it is obvious the improvements may be readily applied upon a machine that cuts at the right hand side of the draft pole.

Having thus described my invention, I claim as new and desire to secure by Letters Patent:

1. In a harvester, a frame, a traction wheel at one end of the frame, a ground wheel at the other end of the frame, mechanism including a clutch for operating the ground wheel from the traction wheel, a tongue pivoted to the frame to swing laterally, a clutch operating means, and means connecting the tongue with the clutch operating means, said means being connected with the tongue in front of its pivotal connection with the frame.

2. In a harvester, a frame, a traction wheel at one end of the frame, a ground wheel at the other end of the frame, mechanism including a clutch for operating the ground wheel from the traction wheel, a lever mechanism for operating the clutch, a tongue pivoted to swing laterally, and a connection between the tongue and the lever mechanism.

3. In a harvester, a frame, a traction wheel at one end of the frame, a ground wheel at the other end of the frame, mechanism including a clutch for operating the ground wheel from the traction wheel, a spring arm engaging one member of the clutch and normally holding the members of the clutch in engagement, a lever mechanism connected with the spring arm, a pivoted tongue, and a connection between the tongue and the lever mechanism.

4. In a harvester, a frame, a traction wheel at one end of the frame, a ground wheel at the other end of the frame, mechanism including a clutch for operating the ground wheel from the traction wheel, a spring arm engaging one member of the clutch and normally holding the members of the clutch in engagement, a pivoted elbow lever, a link pivoted to the short member of the elbow lever and engaging the spring arm, a pivoted tongue, and a bar having one end secured to the tongue and its other end pivoted to the long member of the elbow lever.

5. The combination with an elongated frame, a traction wheel rotatable on the frame near one end thereof, a ground wheel rotatable at the opposite end of said frame, and a rotatably supported shaft extending along the front side of the frame between the planes of said wheels, of clutching means actuated by the rotation of the traction wheel adapted for transmitting rotary motion to the shaft when the traction wheel is moved forward, a swiveled tongue, and clutch releasing means operatively connected with the tongue, whereby the motion of the shaft will be arrested when the tongue moves laterally in direction of the ground wheel.

6. The combination with a harvester frame, a traction wheel at one end of said frame, a ground wheel at the other end thereof, a rotatably supported shaft on the frame, extended intermediately of the planes of these wheels, and means for transmitting rotary motion from the traction wheel to the shaft and thence to the ground wheel, of a draft pole pivoted at one end to the frame in alinement with the traction wheel, a clutch device on the shaft, and an arm rigidly secured to the pole in front of its pivot and having its other end operatively connected with said clutch device, and adapted for permitting the transmission of rotary motion from the traction wheel to the shaft when the draft pole is alined with the traction wheel, and for arresting such motion when the pole is swung laterally toward said shaft.

7. The combination with an elongated frame, a rotatable traction wheel on one end of said frame, a rotatable ground wheel on the other end of the frame, and a shaft rotatably supported on the frame and extending between the planes of said wheels, of means adapted for transmitting rotary motion from the traction wheel to the shaft and thence to the ground wheel, and controlling means for such a transmission of motion, comprising a draft pole pivoted by its rear end on the frame opposite the traction wheel, an angle lever pivoted on the frame, a clutch device on the shaft and connected with the angle lever, the vibration of said lever opening or closing the clutch device, and an arm extended from the pole to the angle lever, which arm will rock the lever and effect the arrest of motion had by the shaft when the pole is swung laterally in direction of the ground wheel.

In testimony whereof I have signed my name to this specification in the presence of two subscribing witnesses.

CHARLES FREDERICK BLAKESLEE

Witnesses:
J. U. LONG,
S. W. LOVE.